United States Patent

Schmidt et al.

[11] Patent Number: 5,960,599
[45] Date of Patent: Oct. 5, 1999

[54] SUPPORT SYSTEM FOR WORKPLACE FURNITURE

[75] Inventors: Markus Schmidt, Betzdorf; Johann Reiter, Arnstorf, both of Germany

[73] Assignee: Knuerr-Mechanik für die Electronik Aktiengesellschaft, München, Germany

[21] Appl. No.: 08/891,613

[22] Filed: Jul. 10, 1997

[30]  Foreign Application Priority Data

Jul. 11, 1996 [DE] Germany ................ 296 10 106 U

[51] Int. Cl.$^6$ .................................................... E04B 1/38
[52] U.S. Cl. ............... 52/282.2; 52/284; 248/297.21; 403/381; 403/231; 403/258
[58] Field of Search .................. 52/282.1, 282.2, 52/280, 281, 282.4, 284, 238.1, 239, 36.5, 36.6; 248/297.21, 223.41, 225.11; 403/311, 231, 230, 256, 258

[56]  References Cited

U.S. PATENT DOCUMENTS

| 3,747,885 | 7/1973 | Ciancimino | 403/231 X |
| 4,034,535 | 7/1977 | Dustmann | 52/280 X |
| 4,163,537 | 8/1979 | Mourgue | 248/297.21 X |
| 4,619,547 | 10/1986 | Renaud-Goud | 403/231 |
| 5,481,842 | 1/1996 | Gautreau | 403/231 X |

*Primary Examiner*—Creighton Smith
*Attorney, Agent, or Firm*—Evenson, McKeown, Edwards & Lenahan, PLLC

[57]  ABSTRACT

This invention relates to a support system for workplace furniture, particularly workshop furniture, with vertical girders, horizontal girders and transverse girders. In order to create a support system for workplace furniture, particularly workshop furniture, which satisfies extremely high stability demands and simultaneously ensures a variant-rich design, at least the vertical girders are formed by a cross profile, which has perpendicularly arranged profile legs. Horizontal girders, transverse girders and further furniture components can be directly or indirectly fixed by the aid of fixing blocks to the profile legs.

22 Claims, 6 Drawing Sheets

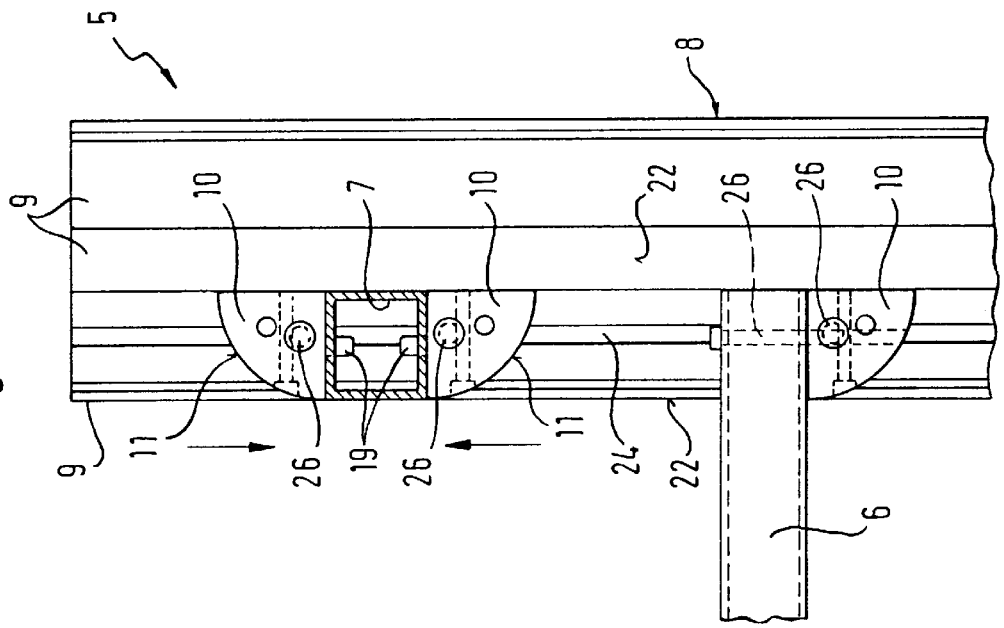
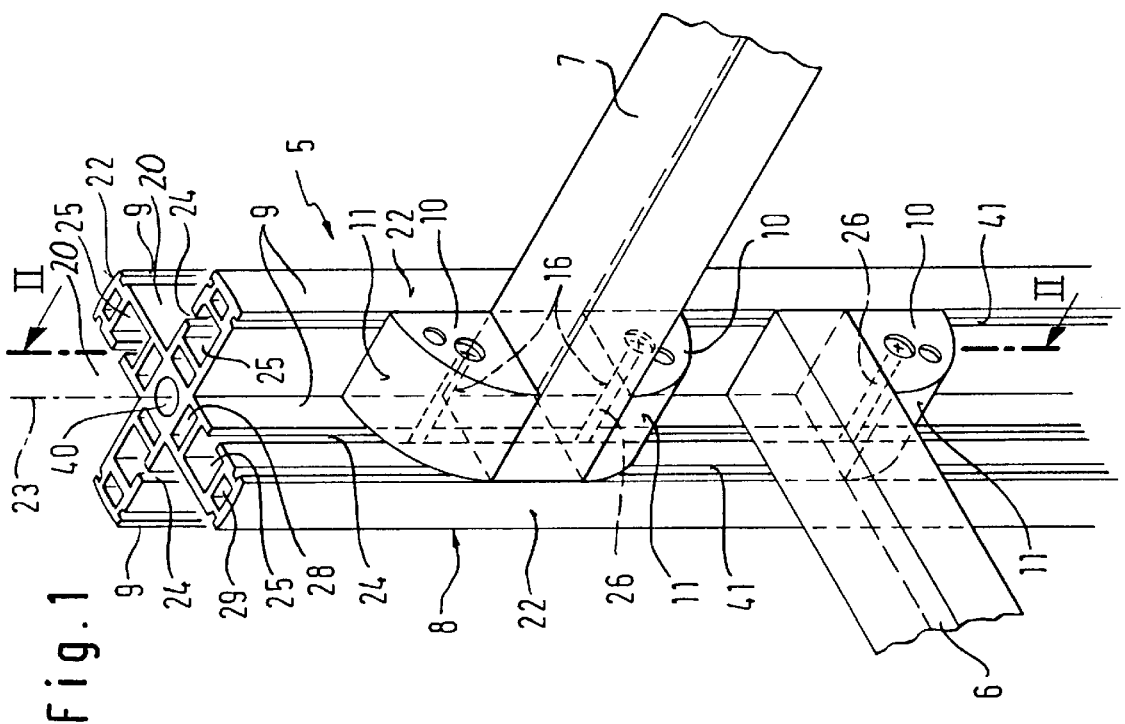

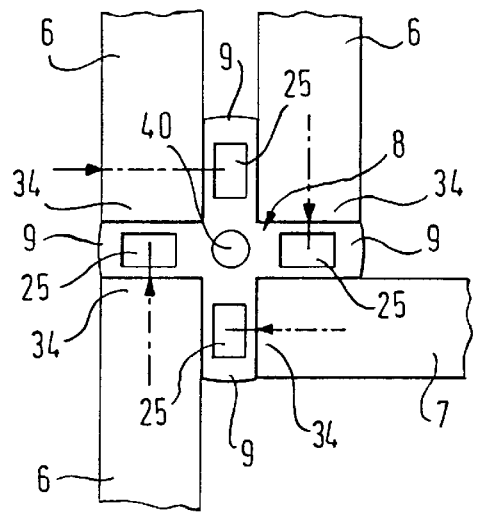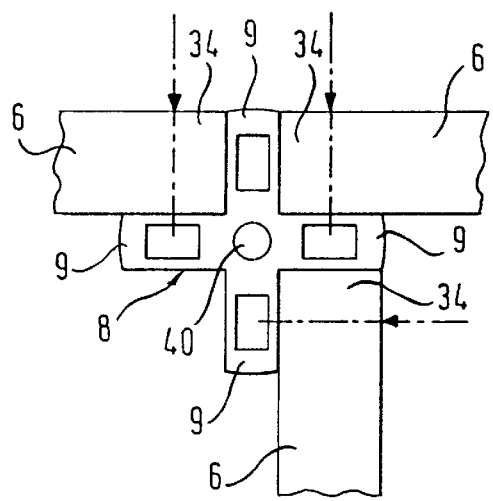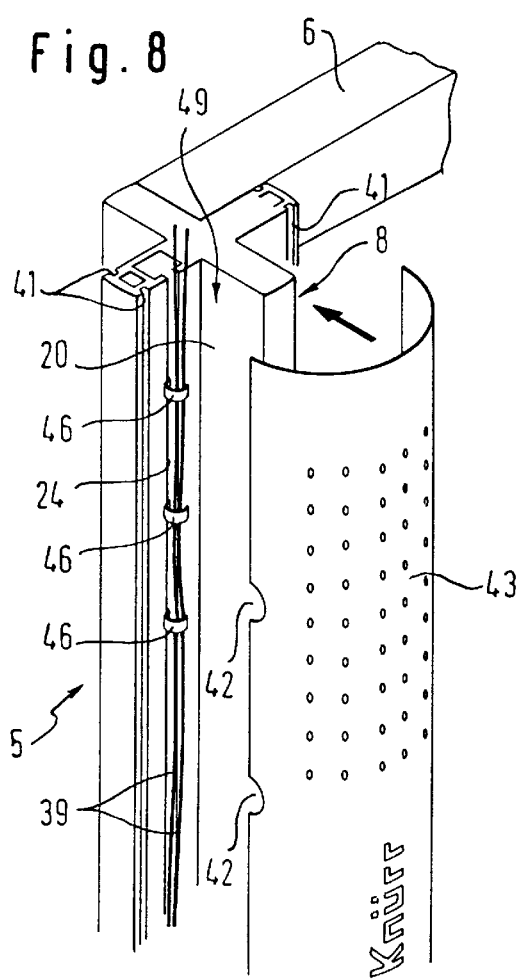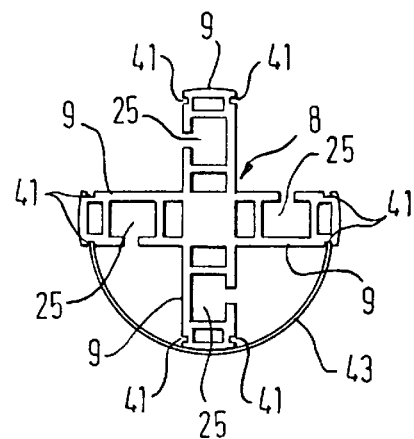

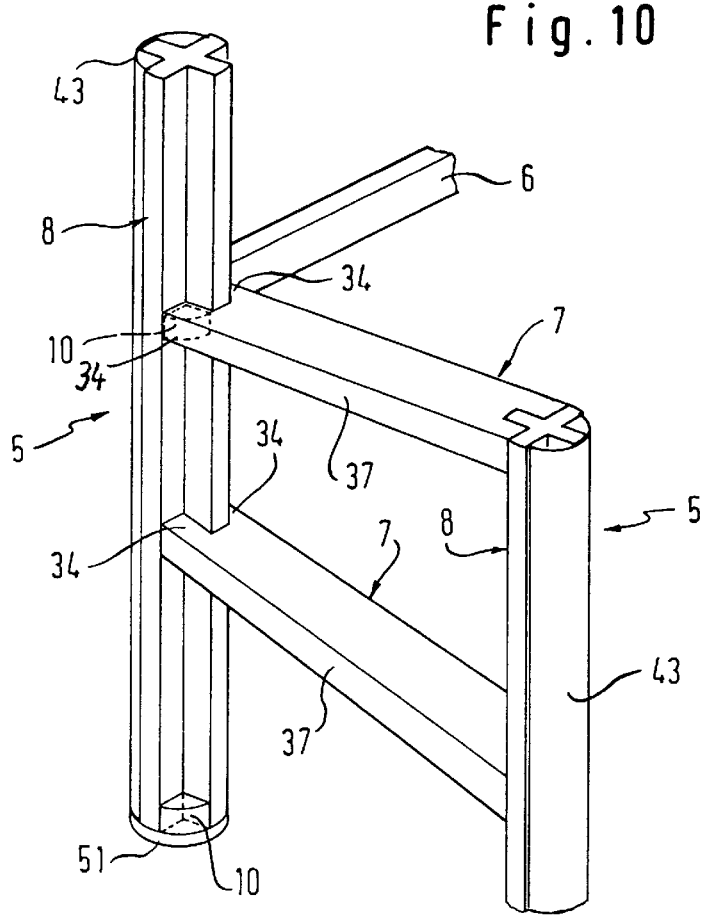
Fig. 10
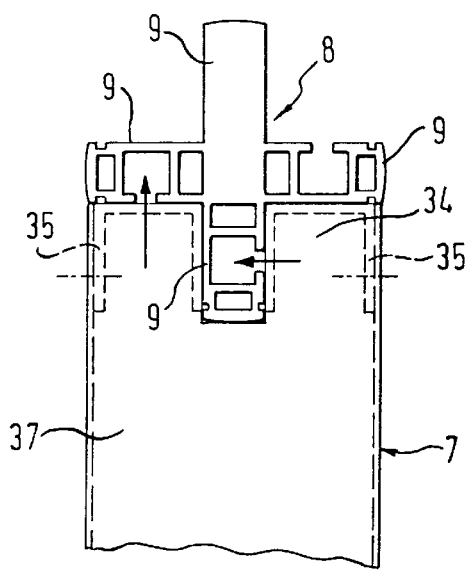
Fig. 11
Fig. 12

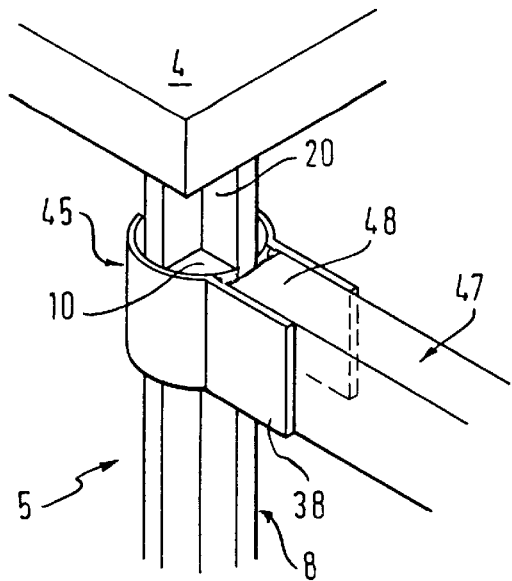
Fig. 13
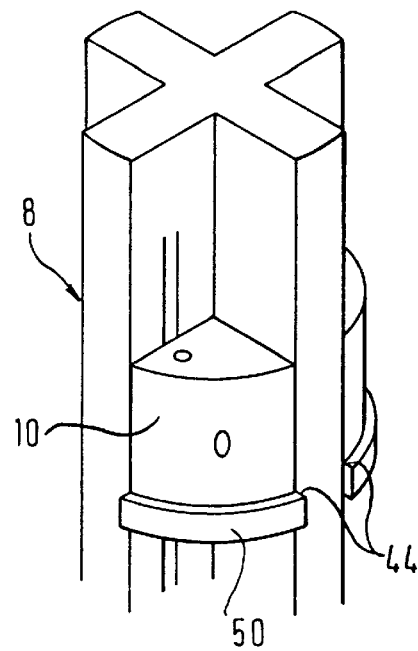
Fig. 14
Fig. 15
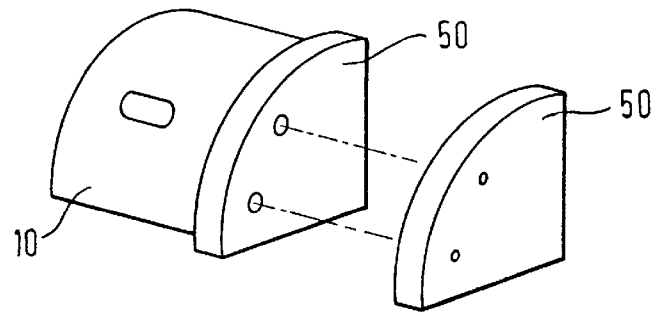
Fig. 16

SUPPORT SYSTEM FOR WORKPLACE FURNITURE

FIELD OF THE INVENTION

The invention relates to a support system for workplace furniture, particularly workshop furniture, with vertical girders, horizontal girders and transverse girders.

DESCRIPTION OF THE PRIOR ART

DE-G 93 01 248.9 discloses workplace furniture, in which a table plate located on brackets is supported on support feet. The support feet have at least one vertical profile or section, as well as a bottom, horizontal foot arm. The vertical profiles are provided with T-slots and with a central inner space in which is guided an inner tube. The inner tube is connected to the associated bracket of the table plate and can be vertically adjusted by means of a sliding guide for adjusting the height of said table plate.

The design concept of this known workplace furniture already allows a variable configuration of workplaces, e.g. the provision of several working planes. It is also possible to subsequently reequip with double support feet and back foot arms.

However, the known workplace furniture can only be used to a limited extent as workshop furniture, because the attainable stability and multiplicity of variants do not in all cases meet demands and space concepts. In addition, the profile used for the support feet only allow a fixing of horizontal and/or transverse girders diametrically to the longitudinal sides of the profile.

SUMMARY OF THE INVENTION

The object of the invention is to provide a support system for workplace furniture, particularly workshop furniture, with which extremely high stability demands can be satisfied and whilst simultaneously ensuring a particularly variable design of worktables and other workshop furniture. In addition, the invention aims at providing a profile or section, which fundamentally allows a securing and/or fixing of constructional elements in different directions and at virtually any height.

According to the invention, this object is achieved by a support system with vertical girders, horizontal girders and transverse girders, in that at least the vertical girders are formed from a cross profile or section, which has perpendicularly positioned profile legs, and that the horizontal girders and transverse girders, as well as further furniture elements are directly fixable or indirectly fixable with fixing blocks to the profile legs.

The invention is based on the idea of creating a profile, which ensures a direct and/or indirect fixing or arrangement of constructional elements, e.g. girders, supports or fitments, to the entire circumference and at any height. On the basis of such a profile, which is preferably used as a vertical girder, it is possible to create stable, variant-rich workplace furniture, particularly workshop furniture.

According to the invention, at least the vertical girders are constructed with a cross profile and preferably from aluminium, to which can be fixed fixing elements, particularly aluminium castings. These fixing elements are provided for the fixing of horizontal girders and/or transverse girders and/or further furniture elements, which are preferably also made from aluminium and allow a stable, vertically adjustable and/or pivotable arrangement of elements of the system.

According to the invention, the cross profile has vertically arranged or crossing profile legs, which are constructed as the centre or intersection for support elements or the like to be arranged in four selectable directions and for fixing block-like fixing elements, referred to hereinafter as fixing blocks.

It is appropriate for the profile legs to have the same length and to have longitudinally positioned fixing openings for receiving the fixing elements for fixing the fixing blocks and/or the horizontal and/or transverse girders. They are arranged between the profile legs in interspaces and preferably fixed by fixing screws to an associated profile leg.

It is particularly advantageous if in each profile leg of a cross profile is provided at least one T-slot with a longitudinally directed groove. In the T-slots can be introduced, for the purpose of securing the fixing screws, spring nuts as securing elements and which are in cooperation with the fixing screws, which are e.g. guided through a fixing block and retain the fixing block in a secure and stable manner on the cross profile.

It is particularly advantageous to position and fix the fixing blocks in a horizontal and in a vertical arrangement in an interspace defined by two profile legs. In a horizontal arrangement accurately constructed outer faces of the fixing blocks with convexly curved end faces of the profile leg of the cross profile form a circular outer contour, because the fixing blocks are constructed roughly as quadrantal cylinders with two parallel circular sector-like top and bottom faces. A fixing block also has two contact surfaces, which are at right angles to one another and with a horizontal arrangement of the fixing block in an interspace of the cross profile engage on in each case one profile leg.

The fixing blocks have a first bore and a second bore allowing a fixing in a horizontal and vertical arrangement. In the horizontal arrangement a fixing element is guided and secured through a first bore, which extends from the outer face through a contact surface into the T-slot of a profile leg. In a vertical arrangement a parallel face engages on a profile leg and a contact surface on the second profile leg. A fixing element is guided through the second bore, which runs diametrically to the first bore and between the two parallel faces. The fixing blocks and their bores are so dimensioned that both horizontally and vertically the first and second bores are aligned with the associated groove. The grooves are so constructed in the cross profile, that in each interspace is located at least one groove and in the same opening direction in a profile leg.

Appropriately the cross profile is provided with a centre bore, into which can be introduced a rod or a support, which can e.g. serve to construct a second or also a third working plane.

The fixing blocks fixed in the interspaces can be positioned within a horizontal or transverse girder constructed as a hollow profile, whereby the latter can also be made from a cross profile.

In an advantageous, stable construction a horizontal or transverse girder is positioned between and fixed to two blocks. In addition, a transverse or horizontal girder can be fixed, e.g. screwed resting on a fixing block.

Due to the fact that in each of the four interspaces of the cross profile are placed with their end regions horizontal and/or transverse girders, the cross profiles constitute intersection points for a table or furniture system. The horizontal and/or transverse girders can be frontally or laterally fixed to the profile legs of the cross profile, so as to permit the implementation of different support system variants.

It is appropriate to provide the fixing blocks with retaining or holding elements, which project in lug-like manner or as bolts and can be inserted in the horizontal and/or transverse girders. The fixing blocks fixable horizontally and vertically in the interspaces can be provided with holding elements, which are detachably received in complementary constructed bores of the fixing blocks, so that the variable horizontal or vertical arrangement is not impeded. The holding elements can alternatively be positioned on the end regions of the girders or the like held between or on the fixing blocks.

If a horizontal or transverse girder is positioned between two fixing blocks with bolts or lugs directed towards one another as holding or engagement elements, the latter can define a rotation or pivoting axis about which can be pivoted the horizontal or transverse girder. It is then possible to fit a workshop furniture system with additional tables or components in any random angular orientation.

Besides this indirect fixing of a horizontal and/or transverse girder or some random further furniture component, the construction of the cross profile and profile legs also allow a direct fixing.

For this purpose it is merely necessary to have corresponding bores for guiding a fixing element or screw, which can be introduced into a groove and secured by a corresponding element in the T-slot.

It is appropriate to match to one another the fixing blocks and cross-sections of the horizontal and/or transverse girders to be fixed, so that e.g. a fixing block can be inserted and fixed in concealed manner in the end region of a horizontal or transverse girder.

It is fundamentally possible to provide at one height each of the four interspaces of the cross profile with a transverse and/or horizontal girder. However, the interspaces can also serve as cable ducts and it is particularly advantageous to fix cable mountings in the vicinity of the slot openings.

In a particularly appropriate construction radially external slots virtually adjacent to the convex end regions of the profile legs are provided in the form of longitudinally oriented recesses, which serve to retain or hold a cover. A cover can be especially designed and e.g. provided with the company name and/or company colours.

It is particularly advantageous to use a semicircular cover or a cover, which covers an interspace over virtually the entire length of the vertical girder. If e.g. marginal recesses are provided in said covers, it is possible to deflect cables guided in the interspaces at the particular height from the vertical guide into a horizontal guide. The covers are preferably clipped or locked in U-shaped longitudinal grooves.

For particularly stable support systems the horizontal and/or transverse girders can be so constructed that they extend with two end regions into two adjacent interspaces of a cross profile. The fixing to in each case one profile leg can take place with fixing blocks or with angle sections or profiles, which are in particular arranged in concealed manner and fixed to the profile legs.

According to a further development of the support system according to the invention a clamp-like adaptor means can be provided, which surrounds and fixes in clip or sleeve like manner a cross profile and in particular a cross profile with horizontally arranged fixing blocks fixed in this area.

On the sleeve or clip-like adaptor is appropriately provided a reception area, which can be formed by two parallel, outwardly directed mounting flanges.

The reception area is constructed in complementary manner to the end regions of a brace, a support or an additional girder or furniture component and permits the arrangement of an additional work surface, assembly plane, etc.

Particularly advantages result from a possible orientation of the reception area, so that as a function of the spatial circumstances a corresponding fitting and construction of a workshop furniture article can be achieved.

For particularly high loads it is possible to use base elements, which e.g. have virtually the same cross-section as the fixing element. The base elements are positioned below the fixing blocks and project radially compared with said blocks. As a result of this radial projection the sleeve or clip-like adaptor elements are supported and are consequently additionally, reliably supported, especially in the case of pivoting movements.

Important advantages of the inventive support system are an inexpensive manufacture of the girders and in particular the cross profiles from aluminium extruded parts, a variant-rich design of a furniture system built up thereon and a continuous vertical adjustability and/or pivotability of the girders or furniture components indirectly fixed by means of fixing blocks to the cross profiles. An integrated cable guide and cover of the interspaces with a specially designed shield ensures a particularly advantageous overall impression of a workshop furniture article constructed on the basis of the support system according to the invention.

BRIEF DESCRIPTION OF THE DRAWINGS

The invention is described in greater detail hereinafter relative to the attached drawings, wherein show:

FIG. 1 A perspective detail of an inventive support system with an inventive cross profile.

FIG. 2 A section along line II—II of FIG. 1.

FIG. 6 A diagrammatic representation of an inventive cross profile with horizontal transverse girders laterally and frontally fixed to the profile legs.

FIG. 7 A second variant for horizontal and vertical girders frontally and laterally fixed to an inventive cross profile.

FIG. 8 A perspective view of an inventive cross profile with cable duct and cover.

FIG. 9 A plan view of an inventive cross profile according to FIG. 8.

FIG. 10 Another variant of a support system according to the invention with double transverse girders and vertical girders.

FIG. 11 A cross-section through a double transverse girder fixed to an inventive cross profile.

FIG. 12 A perspective view of an end region of a double transverse girder.

FIG. 13 A perspective view of an adaptor in the vicinity of a transverse profile.

FIG. 14 A fixing block with base element arranged in an interspace of an inventive cross profile.

FIG. 15 A cross-section through a cross profile with fixing blocks and adaptor.

FIG. 16 A perspective view of a fixing element with base element.

DETAILED DESCRIPTION OF THE DRAWINGS

Figure 3:
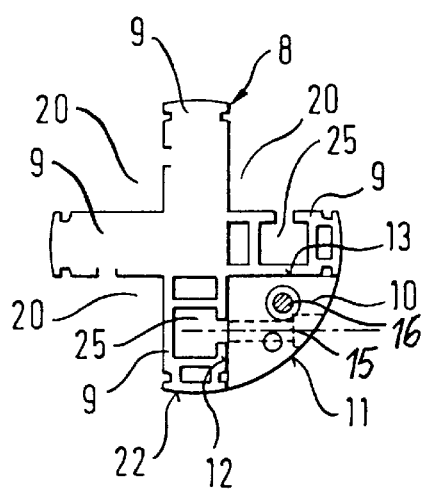
FIG. 3 A plan view of a cross profile according to the invention with a horizontally positioned fixing block in an interspace.

FIG. 1 is a perspective view of a support system according to the invention in detail form with a vertical girder 5 and a transverse girder 7 and horizontal girder 6 fixed thereto.

The transverse girder 7 and horizontal girder 6 are fixed to a cross profile 8 with the aid of fixing blocks 10 arranged in vertical manner. Both the cross profile 8 of the vertical girder 5 and also the horizontal girder 6 and transverse girder 7, together with the fixing elements 10 are made form aluminium and constitute extruded sections or castings.

The cross profile 8 has four profile legs 9, in principle constructed identically, as well as a centre bore 40, which is constructed in circular manner with a centre point defining the longitudinal axis 23. The cross profile 8 constructed as a hollow profile is provided in the vicinity of the profile legs 9 with in each case an inner bore, and an outer, approximately rectangular bore 28, 29.

Between these longitudinally directed bores 28, 29 is formed in each profile leg 9 a T-slot 25, whose slot opening 21 is directed towards an interspace 20 and serves as a fixing opening 24 for receiving a fixing element 26, particularly a fixing screw. The securing of the fixing elements 26 can take place with a nut, particularly a not shown spring nut, within the T-slots 25.

In FIG. 1 between two fixing blocks 10 is provided a transverse girder 7 and resting on a further, lower fixing block 10 a horizontal girder 6 with its end regions. Both the fixing blocks 10 and the horizontal or transverse girders 6 are in each case in engagement by two faces or sides on the profile legs 9. Fixing takes place indirectly by means of fixing blocks 10, which for receiving and guiding fixing elements 26 have a first bore and a second bore 15, 16.

The fixing blocks 10 are shown in vertically arranged and fixed manner in FIG. 1 and the corresponding sectional representation of FIG. 2. In this arrangement through the second bore 16 passing between two parallel faces 17, 18 (cf. also FIG. 4), a fixing screw as the fixing element 26 extends into the T-slot 25.

FIG. 2 illustrates the retention of the transverse girder 7, which is secured between two fixing blocks 10, with the aid of projecting holding or engagement elements 19. In the example according to FIG. 2 a holding element 19 of an upper fixing block 10 and a holding element 19 of a lower fixing block 10 project into a transverse girder 7 constructed as a hollow profile and secures the position thereof.

The lower horizontal girder 6 is fixed to the fixing block 10 below it by a fixing element 10, particularly a screw.

The cross profiles 8 or their profile legs 9 have convexly constructed end faces 22, which are laterally bounded by longitudinal recesses, e.g. U-shaped longitudinal grooves 41. The U-shaped grooves 41 are used for the clamping or locking reception of a cover 43 (cf. FIGS. 8 and 9).

Figure 4:
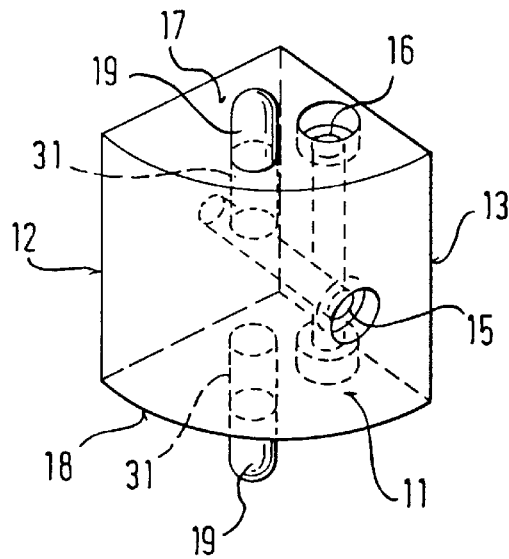
FIG. 4 A perspective view of a fixing block.
Figure 5:
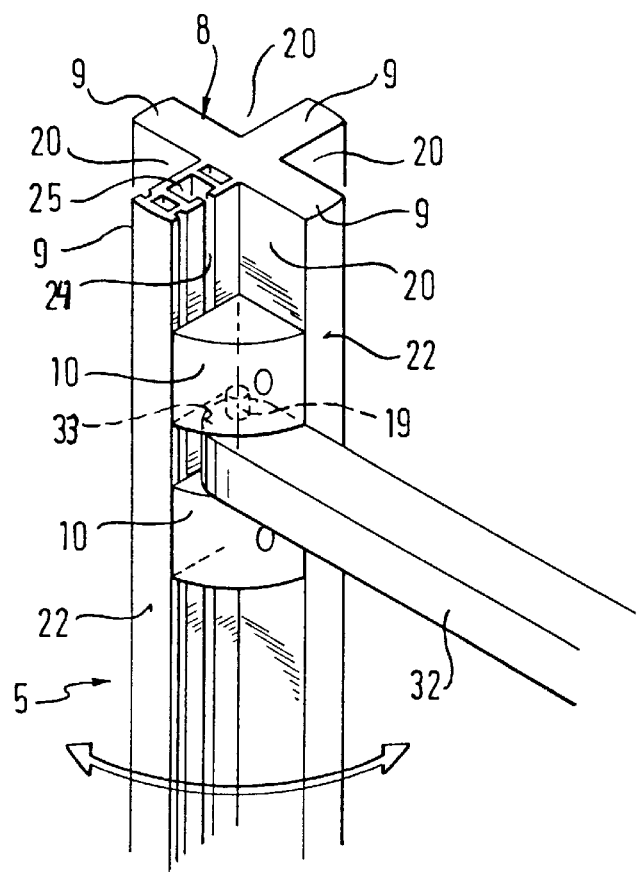
FIG. 5 A cross profile according to the invention as a vertical girder with a pivotable furniture component.

In FIGS. 3, 4 and 5 are in each case shown the fixing blocks 10 in a horizontal arrangement. It is clear that the fixing blocks 10 in the horizontal arrangement are constructed in complementary manner to the interspaces 20 of the cross profile 8 and have an outer face 11, forming in this embodiment with the convex end faces 22 of the profile legs 9 a circular circumference of a cross profile 8 or a vertical girder 5. It is also possible to have an elliptical contour, which is formed by profile legs of different length and which cross perpendicularly and in particular centrally.

In the cross-section shown in FIG. 3 only two profile legs 9 are completely shown. Dot-dash lines indicate the fixing possibilities and show that the bores 15, 16 in a fixing block 10 running diametrically to one another, as a function of the vertical or horizontal arrangement of the fixing blocks 10, are aligned with the slot opening 21 of the corresponding profile leg 9.

A horizontally fixing block 10 has a circular sector-like construction in cross-section. Two contact surfaces 12, 13 are at right angles to one another and in each case engage on a profile leg 9. Two parallel faces 17, 18 are provided with bores 31 serving to receive holding or engagement elements 19. These holding elements 19 are in this example detachably located in bores 31 of the parallel faces 17, 18 and serve to fix horizontal girders 6 or transverse girders 7.

FIG. 5 shows a pivotable arrangement of a furniture component 32 with the aid of holding or engagement elements 19. The furniture component 32 has a rounded front area 33 and not shown bores, in which engage the holding elements 19 of the upper fixing block and lower fixing block 10, accompanied by the formation of a vertical pivoting axis.

In the arrangement shown in FIG. 5 an approximately 90° pivoting movement is possible. The further features identical to the preceding drawings are given the same reference numerals.

Apart from the pivotability about a vertical axis defined by the holding elements 9, the transverse girders 7, horizontal girders 6 and additional furniture components 32 are vertically adjustable and in particular continuously fixable.

FIGS. 6 and 7 show the possible frontal or lateral arrangements and fastenings of horizontal girders 6 and vertical girders 7. The fastening of the end regions 34 generally takes place indirectly with the aid of the fixing blocks 10 or also directly and is in each case indicated by broken arrow lines. The cross profiles 8 are diagrammatically represented and have identical reference numerals for identical features.

FIG. 8 and the substantially corresponding cross-sectional representation of FIG. 9 show a vertical girder 5 with cross profile 8 and a semicircular cover 43. In a rear interspace 20 is received and fixed a horizontal girder 6, whilst a front interspace 20 serves as a cable duct 49. To this end cable mountings 46 are fixed in the groove 24.

The cover 43 is semicircular and provided with a company logo. Recesses 42 in the lateral regions of the cover 43 permit the insertion and removal of cable lines 39.

In FIG. 9 the cover 43 is locked or clipped in U-shaped grooves 41 of the profile legs 9.

FIG. 10 shows another variant of a support system with a vertical girder 5, which is arranged as a rear vertical girder 5, as well as a front vertical girder 5. The two vertical girders 5 are connected by a transverse girder 7, which is constructed as a double transverse girder 37. This takes place in such a way that the fixing blocks 10 are received in end regions 34 of the transverse girder 37 and are consequently invisible from the outside.

FIG. 10 reveals this concealed arrangement with respect to the left-hand end region 34 of the upper double transverse girder 37. This fixing arrangement is advantageous if covers 43 are to be fitted. The front cross profile 8 is provided with a semicircular cover 43.

In an inclined, diagonal arrangement is fixed a lower transverse girder 7, which is also constructed as a particularly stable double transverse girder 37. The fixing of said transverse girder 7 can take place both with fixing blocks 10 and with angle elements 35, which as example are shown in FIG. 11. FIG. 10 shows that the fixing blocks 10 can also be located on the bottom, in order to e.g. fix a bottom plate 51 to the cross profile 8.

The angle elements 35 of FIG. 11 are used for an alternative fixing of a double transverse girder 37, which for the reception of a profile leg 9 of the cross profile 8 has a central recess 36. The angle elements 35 are welded or screwed in the double transverse girder 37, as is shown by broken lines. The fixing can take place directly or indirectly with not shown fixing blocks 10 located below, as well as with fixing elements 26 which, as the arrows indicate, extend into the T-slots 24 and are positionally fixed there.

FIG. 13 shows an edge region of a workshop table 4 in the area of a front vertical girder 5. Said vertical girder 5 is once again formed from a cross profile 8, in whose interspaces 20 is in each case fixed a fixing block 10. In order to fix a brace 47 as part of a further furniture component, e.g. a second table plane, to the vertical girder 5, an adaptor 45 is provided which almost completely embraces said girder 5 in the vicinity of the fixing blocks 10.

FIG. 15 shows a sectional arrangement making it clear that the clip or sleeve-like adaptor 45 embraces three fixing blocks 10 in interspaces 20 and the profile legs 9 of the cross profile 8. The additional brace 47 is received and fixed with its end region in a reception area 48 of the adaptor 45, the reception area 48 being formed by two parallel fixing or mounting flanges 38.

It is particularly advantageous to have a rotary arrangement of the adaptor 45 on the vertical girder 5. For the implementation thereof it is appropriate to provide the fixing blocks 10 with a base element 50 (cf. FIGS. 14 and 16).

FIG. 16 shows a possible fixing of a base element 50 to a fixing block 10. For supporting and securing the sleeve-like adaptor 45, it is appropriate for the base element 50 to have a radially projecting area 44 (FIG. 14). It is then particularly easy and rapid to achieve a secure, stable and freely selectable orientation and/or rotary arrangement of a further furniture component, girder or fitment for a workplace table.

Figure 17:
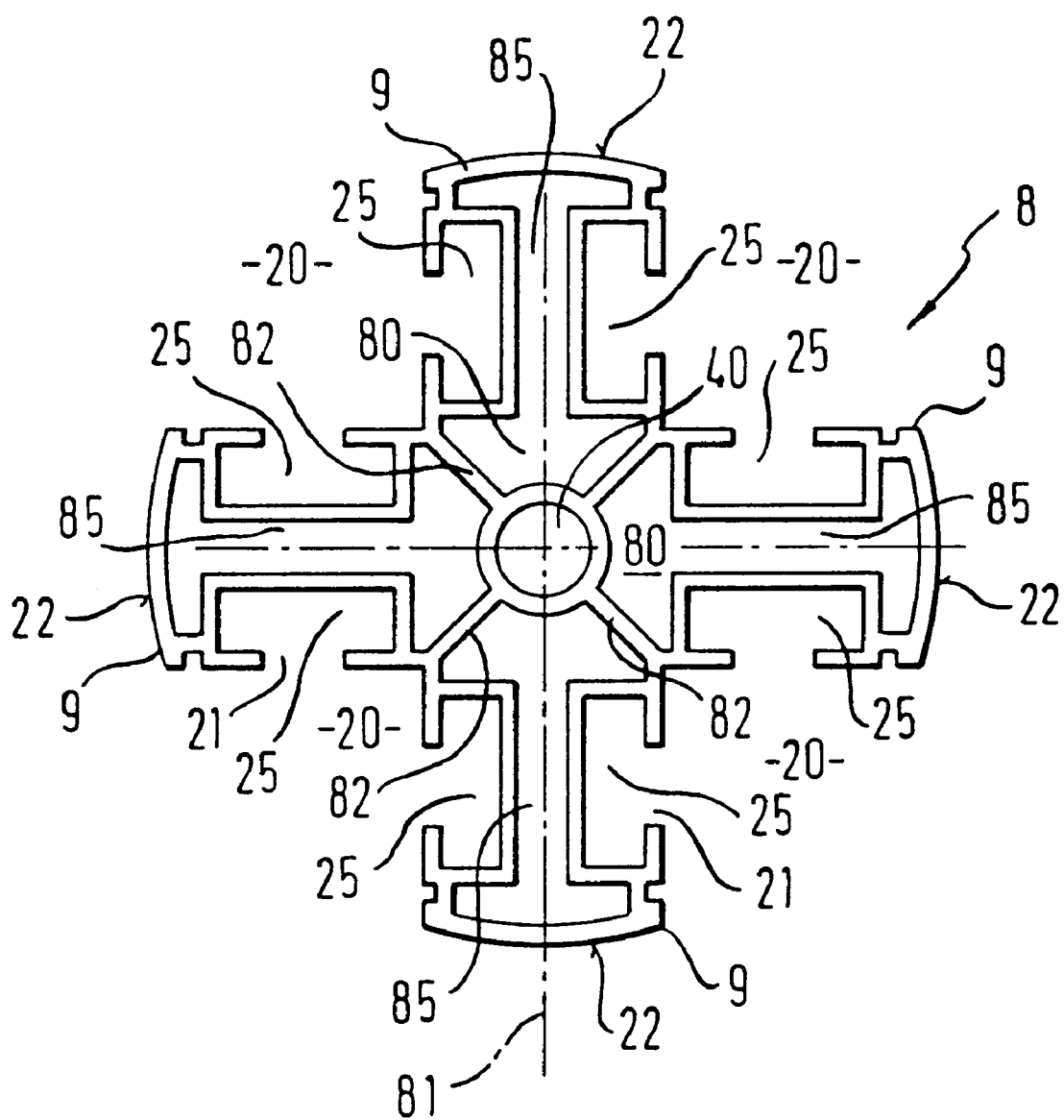
FIG. 17 A cross-section of a variant of a cross profile according to the invention.

FIG. 17 shows in a cross-sectional view an alternatively constructed cross profile 8. The four profile legs 19 are identically constructed and the centre bore 40 having a circular cross-section is held by means of diagonal braces 82 in a profile space 80, which is virtually square.

Whereas the cross profiles of the preceding drawings have in their profile legs forming a right angle in each case one T-slot 25 as the fixing opening for the fixing blocks 10 and/or vertical girders 5, horizontal girders 6 and/or transverse girders 7, on the profile legs 9 of the cross profile 8 of FIG. 17 are in each case provided two T-slots 25. With an interspace 20, bounded by in each case two profile legs 9, are associated two T-slots 25 with longitudinal slot openings 21. A fixing block 10 (cf. FIGS. 1 to 5 and 13 to 16) and/or a horizontal girder 6, a transverse girder 7 or a double transverse girder 37 can consequently be fixed in that arbitrarily a fixing element (not shown) is fixed in a T-slot 25 or two fixing elements (not shown) in two T-slots 25 of an interspace 20. Thus, an improved design possibility is provided, whilst leading to a greater stability in the case of direct and/or indirect fixing of constructional elements.

Another advantage of the cross profile 8 according to FIG. 17 is that with the square profile space 80 and a profile leg interspace hollow space 85 extending up to the convex end faces 22 of each profile leg 9, a weight-reduced profile is obtained, which requires a particularly small use of material for extremely high stability.

We claim:

1. Support system for workplace furniture comprising:
   vertical girders, horizontal girders and transverse girders, at least the vertical girders being formed from a cross profile, said cross profile comprising profile legs which are perpendicularly arranged and interspaces defined between each pair of adjacent profile legs, and
   fixing blocks positioned and received in the interspaces, wherein said profile legs are provided with longitudinally directed T-slots as fixing openings and said fixing blocks, horizontal girders and transverse girders are received in the interspaces and fixed with fixing elements in the fixing openings.

2. Support system according to claim 1, wherein the cross profile is a hollow profile.

3. Support system according to claim 1, wherein the profile legs of the cross profile are constructed with convex end faces, the fixing blocks are arranged horizontally in the interspaces and are constructed with convex outer faces, and end faces of the profile legs and outer faces of the horizontally positioned fixing blocks are positively received in the interspaces and form circular outer contours of the vertical girders.

4. Support system according to claim 2, wherein the fixing elements are fixing screws for detachable, continuously vertically adjustable retention of the horizontal girders, transverse girders and fixing blocks.

5. Support system according to claim 4, wherein the fixing blocks are positioned in the interspaces in one of a horizontal arrangement and a vertical arrangement so that in the horizontal arrangement at least one fixing element is guided and held by a first bore extending from an outer fixing block face through a contact surface and into the T-slot and in the vertical arrangement a fixing element is guided through a second bore which runs diametrically to the first bore between two parallel fixing block faces.

6. Support system according to claim 5, wherein the T-slots of the profile legs are so arranged that at least one slot opening is located in each interspace.

7. Support system according to claim 5, wherein the fixing blocks are provided with holding elements engaging in complementary recesses of the horizontal girders, transverse girders or furniture components.

8. Support system according to claim 7, wherein the holding elements are pivot pins permitting furniture components to pivot and are detachably received in bores in areas of parallel faces of the fixing blades.

9. Support system according to claim 8, wherein the holding elements are arranged substantially on an angle bisector of the parallel faces of the fixing blocks and a furniture component located between two fixing blocks with holding elements has a rounded front area and is pivotable through a range of approximately 90°.

10. Support system according to claim 6, wherein the horizontal girders and transverse girders are located in the interspaces and are with end regions frontally or laterally fixed to the profile legs.

11. Support system according to claim 5, wherein the fixing blocks in the horizontal arrangement are positioned in a concealed manner and fixed in the horizontal and transverse girders or furniture components.

12. Support system according to claim 4, wherein the cross profile has a centre bore and the profile legs are radially outwardly provided with longitudinal grooves for receiving a cover or a clippable or lockable semicircular cover.

13. Support system according to claim 12, and further comprising further adaptors which positively and non-positively surround the cross profile in a region of the fixing blocks and are retained on the cross profile.

14. Support system according to claim 13, wherein each adaptor is constructed in sleeve or clip-like manner and is provided with a reception area for a furniture component or a brace.

15. Support system according to claim 13, wherein the adaptors are fixed to the cross profiles in a region of the fixing blocks in a freely rotatable, vertically adjustable manner, the adaptors extend over an entire circumference of a cross profile or at least one interspace of the cross profile which is freely accessible and useable as a cable duct, and cable mountings are fixable in the fixing openings of the profile legs.

16. Support system according to claim 15, and further comprising base elements provided for reception of high loads, wherein the adapters are fixed below the fixing blocks and have radial projecting lengths when providing pivotable adaptors.

17. Support system according to claim 16, wherein the cross profiles, horizontal girders and transverse girders are made from aluminium and the fixing blocks are constructed as castings.

18. A furniture support system comprising:

fixing girders, fixable in T-slots as fixing openings, a profile constructed as a cross profile with perpendicularly positioned profile legs and interspaces defined between each pair of adjacent profile legs, the T-slots being formed in the profile legs, said girders being receivable, together with other constructional elements, with end parts in said interspaces and fixed to the profile legs, and fixing blocks which are receivable in the interspaces and fixable with fixing elements in the T-slots formed in the profile legs.

19. A furniture support system according to claim 18, wherein the profile legs are constructed as identical, crossing profile legs, the fixing openings are constituted by at least one slot opening of a longitudinally directed T-slot in each profile leg, and the profile legs are provided with end faces which are convex and form an almost circular outer contour of the cross profile.

20. A furniture support system according to claim 19, wherein the cross profile is provided with a central bore and the profile legs are provided with longitudinal grooves constructed for a clampable and/or lockable reception of covers.

21. A furniture support system according to claim 18, wherein each profile leg of the cross profile is provided with two T-slots constructed in mirror symmetrical manner to a profile leg axis.

22. A furniture support system according to claim 20, wherein the central bore is held with diagonal braces in a central profile cavity and each leg has a longitudinal leg cavity.

* * * * *